F. E. FARLEY.
DRILL.
APPLICATION FILED DEC. 8, 1909.
973,489.
Patented Oct. 25, 1910.
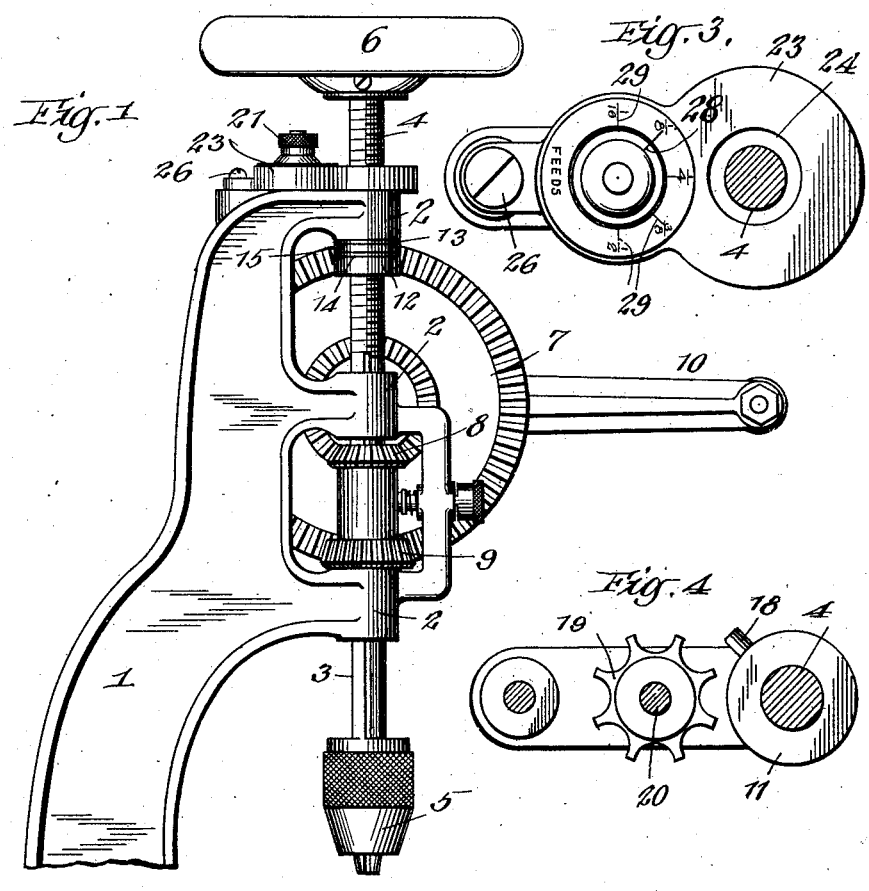
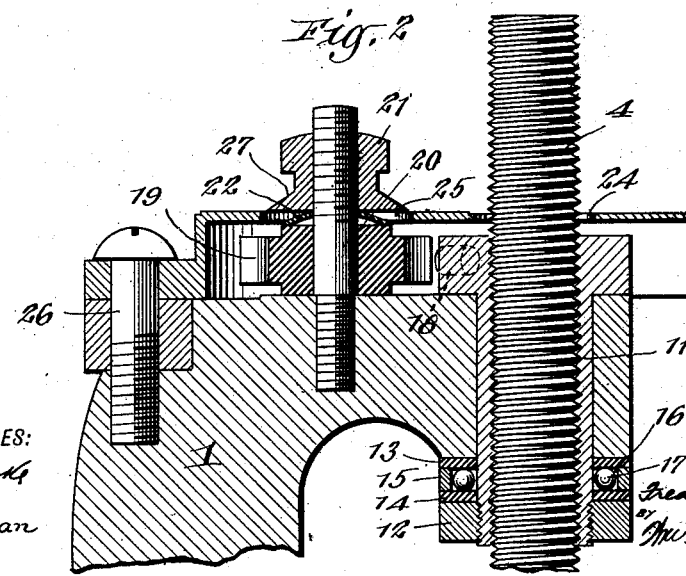
WITNESSES:
W. P. Burke
A. F. Heuman
INVENTOR
Fred E. Farley
by Wallace White
ATTORNEY

UNITED STATES PATENT OFFICE.

FRED E. FARLEY, OF GREENFIELD, MASSACHUSETTS, ASSIGNOR TO GOODELL-PRATT COMPANY, OF GREENFIELD, MASSACHUSETTS, A CORPORATION OF MASSACHUSETTS.

DRILL.

973,489.  Specification of Letters Patent.  Patented Oct. 25, 1910.

Application filed December 8, 1909. Serial No. 532,083.

To all whom it may concern:

Be it known that I, FRED E. FARLEY, a citizen of the United States, residing at Greenfield, county of Franklin, State of Massachusetts, have invented new and useful Improvements in Drills, of which the following is a specification.

This invention relates to drills and more particularly to the feeding mechanism therefor.

One of the objects of the invention is to provide feeding mechanism that may be easily adjusted and which may be used upon moderate priced drills.

Other objects will be in part obvious and in part pointed out in the claims.

In the accompanying drawings showing an illustrative embodiment of the invention, and in which the same reference numerals refer to similar parts in the several figures, Figure 1 is a side elevation of a drill embodying the invention. Fig. 2 is a vertical sectional view of the feeding mechanism. Fig. 3 is a plan view, parts being removed for the sake of clearness. Fig. 4 is a detailed view in plan showing the upper end of the spool and the star wheel.

In the illustrative embodiment of the invention shown in the drawings 1 indicates a frame of any suitable construction provided with bearings 2 in which a spindle 3 is supported. The spindle is threaded throughout a portion of its length in the usual manner, as indicated at 4, and is also provided at its lower end with a chuck 5 of any suitable type for holding a tool. If desired, a hand wheel 6 may be secured to the upper end of the spindle as is usual in drills of this character. Motion may be imparted to the spindle in any suitable manner, as by means of a gear 7, meshing with gears 8 and 9, either of which is adapted to be operatively connected to the spindle 3, the gear 7 being rotated as by a handle 10. The parts so far described may be of any suitable construction and form no part of the invention.

Rotatably mounted within one of the bearings 2, preferably the upper one, is a spool 11 having an interior thread corresponding to, and adapted to engage with the thread of the spindle 3. One of the spool heads, as for example, the lower one, 12, is removable from the body portion of the spool, being threaded thereon as indicated in Fig. 2, thus providing means for assembling the parts.

In order to reduce the friction between the spool and the frame, as the former rotates, there is preferably provided a ball bearing comprising washers 13 and 14, between which a ring 15 is located, thus forming a raceway 16 for balls 17. Secured to the spool, preferably to its upper head, is a pin 18, adapted as the spool rotates to engage the teeth of a star wheel 19, pivotally mounted upon the frame as by means of a stud 20, the lower end of which is threaded to engage a threaded opening in the frame, and the upper end of which is likewise threaded to receive a thumb nut 21.

A spring washer 22 is interposed between the nut 21 and the star wheel 19, as clearly shown in Fig. 2, from which it will be understood that by varying the position of the nut with respect to the star wheel, the tension of the spring washer will be varied and therefore the power required to rotate the star wheel will also be varied. A suitable casing 23 is provided having openings 24 and 25 for receiving the spindle 3 and nut 21, respectively, which casing is removably maintained in position, as by a bolt 26 engaging the frame.

The nut 21 is preferably provided with a lower flange 27 upon which a mark 28 is placed, which mark is adapted to register with one of a series of marks 29 placed upon the casing 23, as shown in Fig. 3. Suitable numbers are placed in juxtaposition to the marks upon the casing, as, for example, the numbers $\frac{1}{16}$, $\frac{1}{8}$, etc. The parts are so adjusted that by turning the nut 21, so that the mark 28 thereon registers with one of the marks 29 upon the casing, the drill will be adapted to operate with a tool having a diameter corresponding to such mark. As shown in Fig. 3 for example, the drill is adapted to be operated with a tool $\frac{1}{8}$ inch in diameter.

The operation of the device will now be described.

As the tool approaches the work, but before it contacts with the same, the friction between the threaded portion 4 of the spindle 3 and the spool 11 will not be sufficient to cause the pin 18 to move the star wheel 19, from which it follows that the spool will be held stationary, thereby causing the spindle to be fed downwardly. When the tool contacts with the work, however, there will be an upward thrust of the spindle, which will cause an increased friction between the threads thereof and the spool, and when this friction reaches a certain amount, the tension upon the star wheel will be overcome, thus permitting the spool to rotate the same until the pin 18 disengages from the teeth of the star wheel with which it was in engagement. As the pin thus becomes disengaged, the spool and the spindle will turn in unison with one another, thereby rotating the tool, but there will be no downward feed of the spindle. The spool and spindle will rotate in unison until the pin contacts with the succeeding tooth of the star wheel, whereupon the movement of the spool will be checked momentarily, causing a slight downward feed of the drill, after which, due to the increased friction between the spool and the spindle, the spool will again be released, as above described. In this manner it will be seen that there is an intermittent feed of the spindle during the operation. After the work is completed the drill will be rotated in the opposite direction, the spool and spindle moving together until the pin 18 engages the star wheel. As the friction between the spindle and spool is very slight during this movement, the spool will be held from rotation and the spindle will be drawn upwardly, thus freeing the tool from the work.

From the above description, it will be observed that the feed is automatic and easily adjusted, and that there is practically no danger of breaking the tool, for as soon as the friction between the tool and the work reaches a certain amount, the spool will be freed from the star wheel, thereby discontinuing the downward feed of the spindle.

Having described the invention in connection with the illustrative embodiment thereof, to the details of which disclosure the invention is not, of course to be limited, what is claimed as new and what is desired to be secured by Letters Patent is set forth in the appended claims.

1. In a device of the class described, in combination, a frame provided with bearings, a spindle rotatably supported in said bearings and provided with a threaded portion, a member rotatably supported in one of said bearings and provided with a threaded portion engaging the threaded portion of the spindle, a projection secured to said member, and means for engaging said projection to arrest the rotation of said member.

2. In a device of the class described, in combination, a frame provided with bearings, a spindle rotatably supported in said bearings and provided with a threaded portion, a member rotatably supported in one of said bearings and provided with a threaded portion engaging the threaded portion of the spindle, a projection secured to said member and means for intermittently engaging said projection to intermittently arrest the rotation of said member.

3. In a device of the class described, in combination, a frame provided with bearings, a spindle rotatably supported in said bearings and provided with a threaded portion, a member rotatably supported in one of said bearings and provided with a threaded portion engaging the threaded portion of the spindle, a projection secured to said member, and a star wheel rotatably mounted upon said frame and positioned to have its teeth engaged by said projection for arresting the rotation of said member.

4. In a device of the class described, in combination, a frame provided with bearings, a spindle rotatably supported in said bearings and provided with a threaded portion, a member rotatably supported in one of said bearings and provided with a threaded portion engaging the threaded portion of the spindle, a projection secured to said member, a star wheel rotatably mounted upon said frame and positioned to have its teeth engaged by said projection for arresting the rotation of said member, and variable tension means associated with said star wheel, whereby the power required to rotate the same may be varied.

5. In a device of the class described, in combination, a frame provided with bearings, a spindle rotatably supported in said bearings and provided with a threaded portion, a member rotatably supported in one of said bearings and provided with a threaded portion engaging the threaded portion of the spindle, a projection secured to said member, a star wheel rotatably mounted upon said frame and positioned to have its teeth engaged by said projection for arresting the rotation of said member, a spring washer engaging said star wheel and adapted to exert pressure thereon, and means for varying the pressure exerted by said washer, whereby the power required to rotate the star wheel may be varied.

6. In a device of the class described, in combination, a frame, a spindle rotatively supported therein and having a threaded portion, a member rotatively supported upon said frame and provided with a threaded portion adapted to engage the threaded portion of the spindle, and automatically releasable holding means normally holding said member against rotation whereby said spindle will be fed at a rate equal to the pitch of the threads thereon, said means automatically releasing said member when the friction between the threaded portion of the spindle and the threaded portion of the member attains a predetermined value whereby said member will rotate in unison with said spindle to prevent further feeding movement of the latter.

In testimony whereof I have signed my name to this specification in the presence of two subscribing witnesses.

FRED E. FARLEY.

Witnesses:
CHARLES N. STODDARD,
JESSIE S. BLACKMER.